United States Patent
Bishara

(10) Patent No.: US 7,870,361 B1
(45) Date of Patent: *Jan. 11, 2011

(54) ALIGNING IP PAYLOADS ON MEMORY BOUNDARIES FOR IMPROVED PERFORMANCE AT A SWITCH

(75) Inventor: Nafea Bishara, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 406 days.

This patent is subject to a terminal disclaimer.

(21) Appl. No.: 12/131,837

(22) Filed: Jun. 2, 2008

Related U.S. Application Data

(63) Continuation of application No. 11/761,876, filed on Jun. 12, 2007, now Pat. No. 7,386,699, which is a continuation of application No. 10/649,187, filed on Aug. 26, 2003, now Pat. No. 7,231,505.

(51) Int. Cl.
*G06F 12/02* (2006.01)
*G06F 12/16* (2006.01)
*G06F 7/00* (2006.01)

(52) U.S. Cl. ................. 711/201; 712/300; 709/236
(58) Field of Classification Search ........... 711/201; 709/236, 238; 712/300; 710/33, 52, 54, 710/65
See application file for complete search history.

(56) References Cited

U.S. PATENT DOCUMENTS

| | | | |
|---|---|---|---|
| 3,916,388 A | 10/1975 | Shimp et al. | |
| 5,491,802 A | 2/1996 | Thompson et al. | |
| 6,009,547 A | 12/1999 | Jaquette et al. | |
| 6,507,901 B1 | 1/2003 | Gopalakrishnan et al. | |
| 6,823,403 B2 | 11/2004 | Gulick et al. | |
| 2005/0132244 A1 | 6/2005 | Milway | |

OTHER PUBLICATIONS

IEEE Computer Society, "*IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications*", IEEE Std 802.3-2002, Sections 1-3.

Trinh, Linh, "TCP/IP Sniffer Designs Teaches Basics of Embedded Ethernet," Electronic Design Home, ID #2099, Apr. 15, 2002.

Office Action from parent U.S. Appl. No. 10/649,187 dated Mar. 16, 2006.

*Primary Examiner*—Jack A Lane

(57) ABSTRACT

A network device includes an alignment module to align payloads of received frames on memory boundaries in a buffer memory. The frames may be Ethernet frames which encapsulate IP (Internet Protocol) packets as payloads. The alignment module modifies the frame to shift the IP payload into a position in the memory regions such that the IP payload is aligned with the memory boundaries. The number x of non-data bits can be determined according to $x=m*c+p$, where m is the bit depth of memory regions, n is the length of a header, p is the non-zero remainder of the ratio n/m, and c is an integer.

24 Claims, 7 Drawing Sheets

| DMY | ETH DEST (MAC DA) | ETH SRC (MAC SA) | ETH TYPE | IP HDR-A | IP DEST | IP SRC | TCP | ETH CRC |
|---|---|---|---|---|---|---|---|---|
| 2 | 6 | 6 | 2 | 12 | 4 | 4 | | 4 |

ALIGNING IP PAYLOADS ON MEMORY BOUNDARIES FOR IMPROVED PERFORMANCE AT A SWITCH

CROSS-REFERENCE

This application is a continuation of U.S. application Ser. No. 11/761,876, filed Jun. 12, 2007 now U.S. Pat. No. 7,386,699, which is a continuation of U.S. application Ser. No. 10/649,187, filed Aug. 26, 2003 (now U.S. Pat. No. 7,231,505). The contents of U.S. Applications No. 11/761,876 and 10/649,187 are incorporated herein by reference in their entirety.

BACKGROUND

TCP/IP (Transmission Control Protocol/Internet Protocol) is the basic communication protocol of the Internet and may also be used as a communications protocol in private networks (e.g., intranets). TCP/IP is frequently referred to as a protocol stack, which refers to the layers through which data passes at both client and server ends of a data exchange. The TCP/IP model has four layers: an application layer (e.g., FTP, SMTP, or Telnet); a transport layer (TCP or UDP); a network layer (IP); and a link layer (e.g., Ethernet).

When TCP/IP is implemented in an Ethernet network, Ethernet frames encapsulate the data for the upper layers. FIG. 1 illustrates a format for an Ethernet frame 100. The Ethernet frame includes header information 105, a payload 110, and trailer information 140. The header information includes a 6 byte MAC (Media Access Control) destination address (DA) portion 120, a 6 byte MAC source address (SA) portion 125, and a 2 byte Type portion 130. The trailer information 140 comprises a 4 byte CRC checksum portion. The payload 110 includes an IP packet with its own header 135 and its own payload 145. Network devices in the network may include TCP/IP software stacks, which enable the network device to extract data from the various packets (e.g., Ethernet frames, IP packets, and TCP datagrams) and to encapsulate and format data for transmission over the appropriate layer.

SUMMARY

A network device, e.g., a switch or a router, in a networked computer system may receive frames and store the frames in a memory having memory regions. The frames include header and payload portions. The header portions of the frames may be of a size that causes the payloads to be misaligned in the memory regions, i.e., not aligned on memory region boundaries, when the frame is stored in the memory.

The network device may include an alignment module that inserts a dummy portion in the frame. The presence of the dummy portion may shift the position of the payload in the memory such that the payload is aligned on a memory region boundary.

In an embodiment, the received frames may be Ethernet frames, which encapsulate IP packets. The frames may have an n-bit header and the memory may have m-bit memory regions, where the ratio n/m has a non-zero remainder p. The alignment module may generate a non-data portion consisting of x bits, where x=m*c+p and c is an integer. The alignment module may modify the received frames to shift the payloads in the memory regions such that the payloads are aligned on memory region boundaries.

DESCRIPTION OF DRAWINGS

FIG. 5 is a block diagram of an Ethernet frame with prefixed dummy bytes.

DETAILED DESCRIPTION

Figure 2:
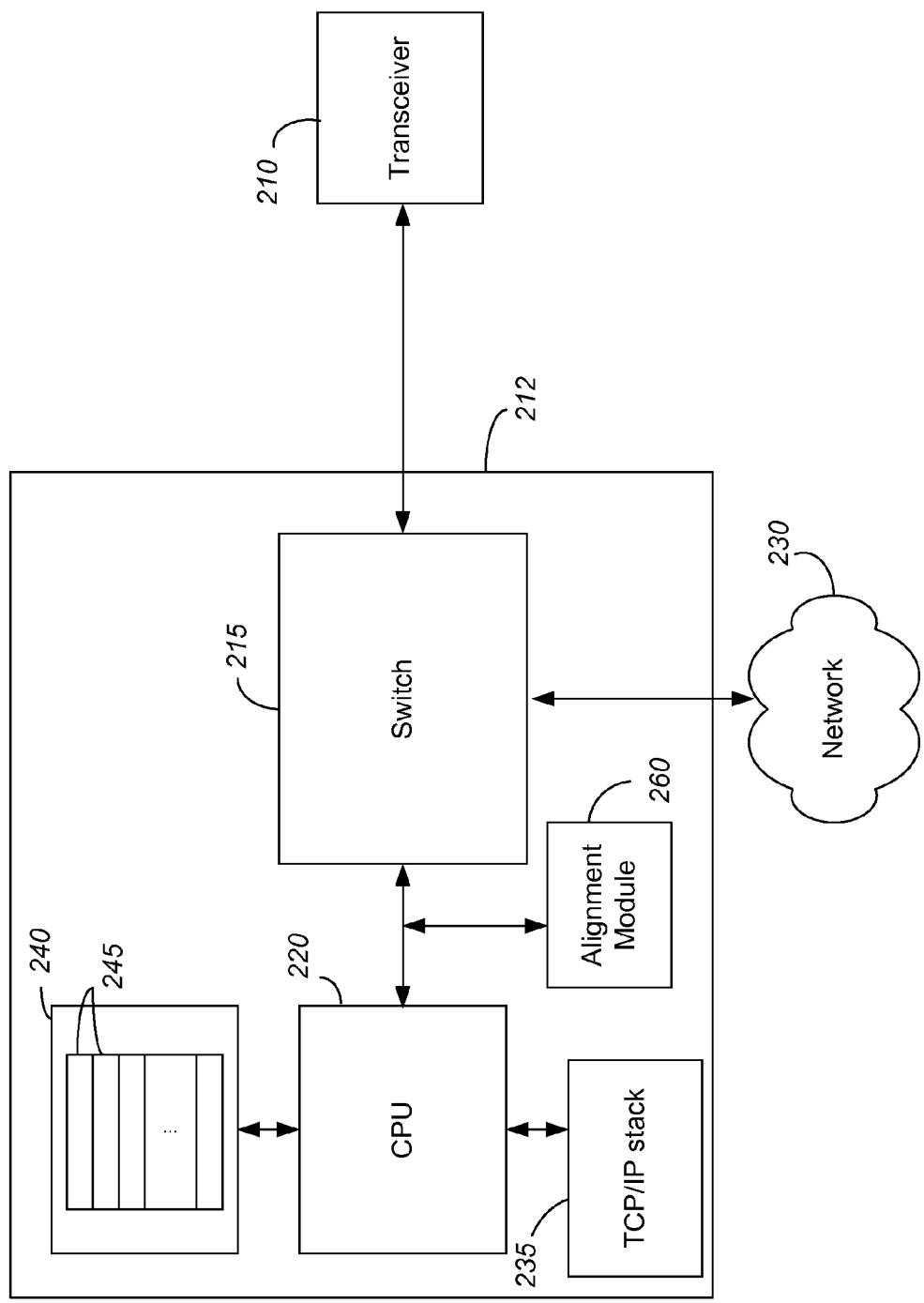
FIG. 2 is a block diagram of a system including a network device according to an embodiment.

FIG. 2 shows a system according to an embodiment. The system may be part of a networked computer system, e.g., a wired or wireless Ethernet LAN (Local Area Network). The system may include a transceiver 210 and a network device 212. The network device may include a switch 215, a CPU (Central Processing Unit) 220 with a buffer memory 240, and a TCP/IP software stack 235. The CPU 220 may be tightly coupled to the switch. For example, the CPU may be embedded in the switch.

Figure 1:
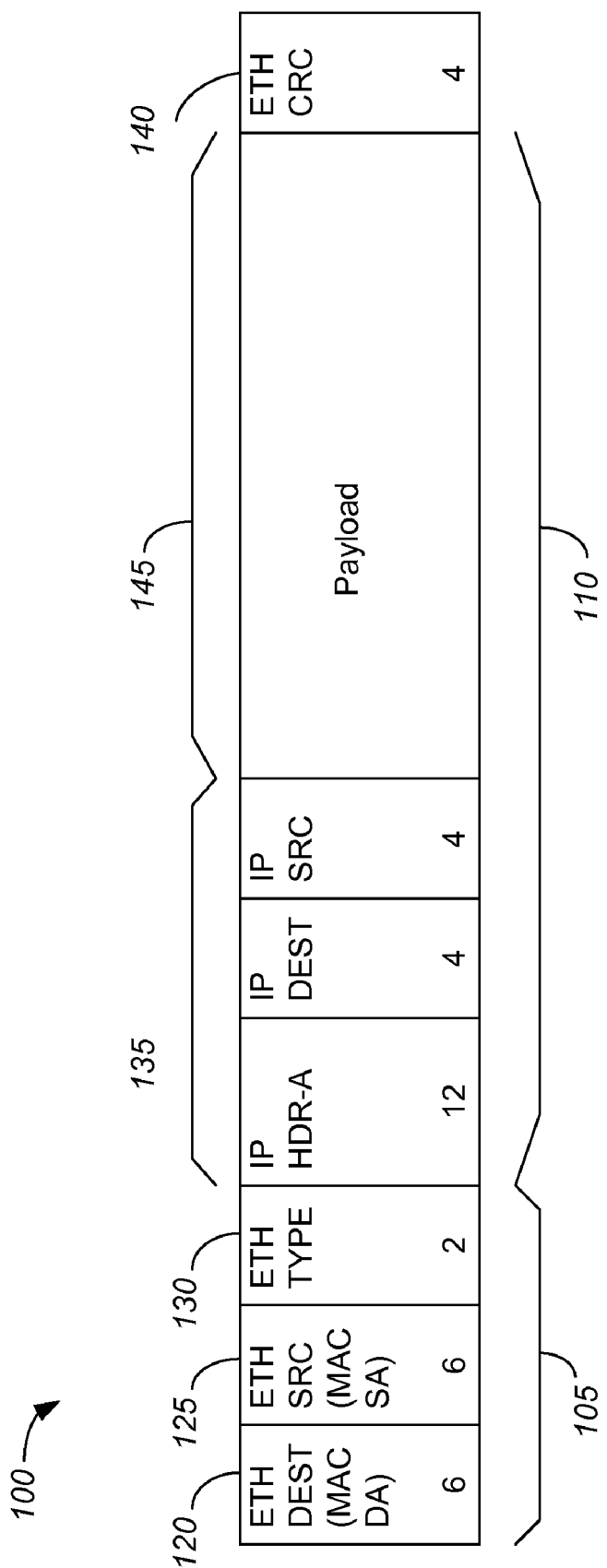
FIG. 1 is a block diagram of an Ethernet frame format.

The transceiver may transmit frames, such as the Ethernet frame 100 shown in FIG. 1, to the switch. The switch may channel incoming frames from any of multiple input ports to the specific output port that will take the frame toward its intended destination. The switch may use the physical device (MAC) address in incoming frames to determine which port to forward the frame to and out of The frame may then be forwarded to another device in the network.

In some instances, information in the IP packet in the payload of a frame may be needed by the switch. For example, the IP packet may be destined for another network 230. The switch, which may have routing capabilities (e.g., a Level 3 switch) or include a router, may use information in the IP header to route the IP packet to the other network. The CPU may use the TCP/IP stack 235 to extract the payload (i.e., the IP packet) from the frame. The switch may then use the information in the IP packet header to route the packet.

Figure 3:
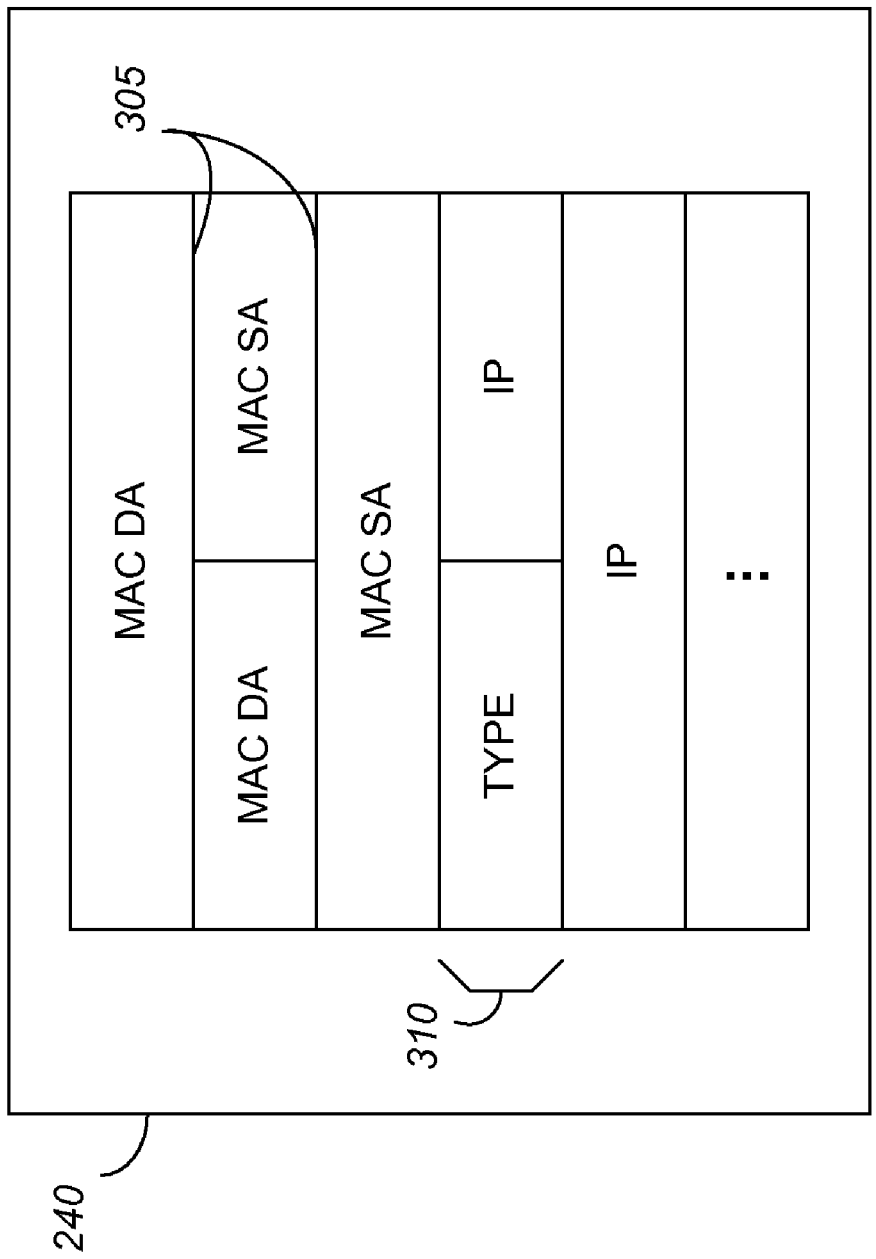
FIG. 3 is a block diagram of memory device including a frame with a misaligned payload.

The CPU 220 may store a received Ethernet frame in the memory 240. In an embodiment, the memory may be partitioned into 4 byte (32-bit or word) memory regions 245. As shown in FIG. 3, in a standard Ethernet frame such as that shown in FIG. 1, the payload (e.g., IP packet) may not be aligned on a 4 byte boundary 305 if stored in the memory 240. The 14 bytes of header information including the MAC DA, MAC SA, and Type portions causes the payload to be misaligned by 2 bytes in a memory region 310.

The operating system utilized by the CPU may require the payload to be aligned on the 4-byte boundaries in the memory 240 for processing. If the payload is misaligned, the TCP/IP stack 235 may copy the payload (e.g., IP packet) into an alternative memory on the 4 byte boundaries (i.e., align the payload) and then use the copy in the alternative memory. However, this extra step may decrease performance in the switch.

Figure 4:
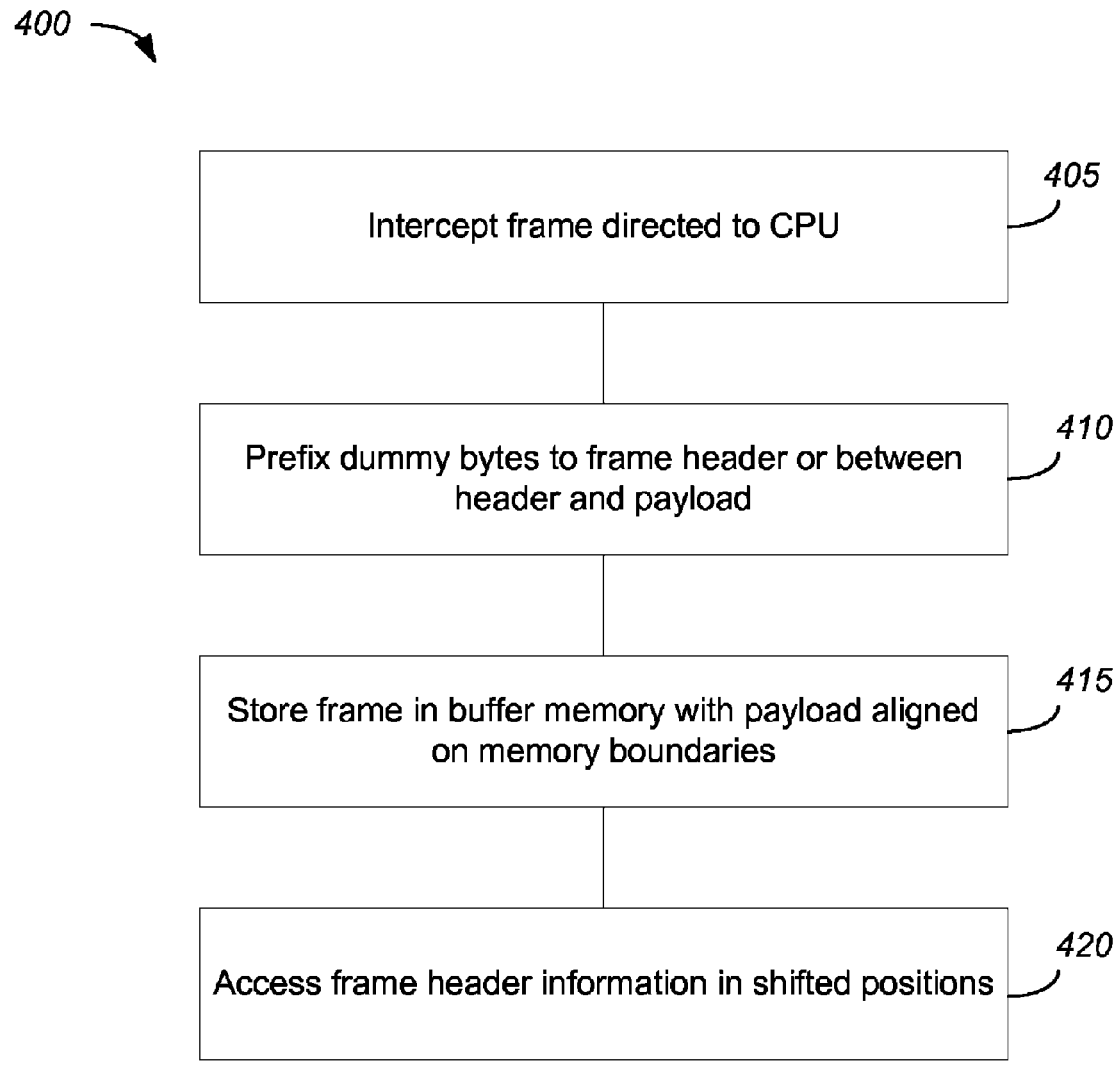
FIG. 4 is a flowchart describing an alignment operation.
Figure 6:
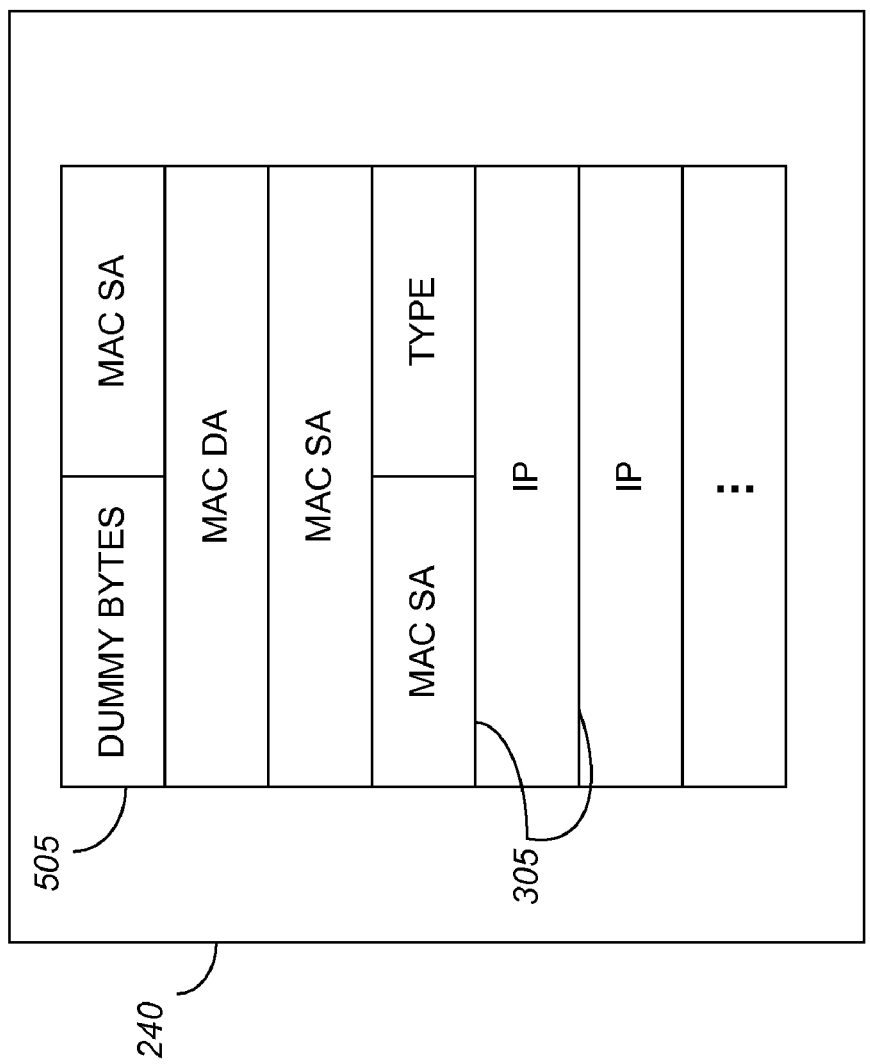
FIG. 6 is a block diagram of memory device including a frame with an aligned payload.

In an embodiment, the network device may include an alignment module 260 that modifies the frames received at the switch to avoid such performance issues. FIG. 4 is a flowchart describing an alignment operation according to an embodiment. The alignment module 260 intercepts frames sent to the CPU (block 405) and prefixes two dummy bytes 505 to the beginning of the frames (block 410), as shown in FIG. 5. The frame is then stored in the memory (block 415). The dummy bytes extend the header to 16 bytes, which shifts the frame in the memory to align the payload on the 4-byte boundaries 305. The CPU 220 and TCP/IP stack 235 may be configured to ignore the dummy bytes 505, and locate and access the frame header information in the shifted byte locations (block 420). Consequently, the TCP/IP stack does not need to copy the payload to an alternative memory, thereby avoiding the performance issue.

Figure 7:
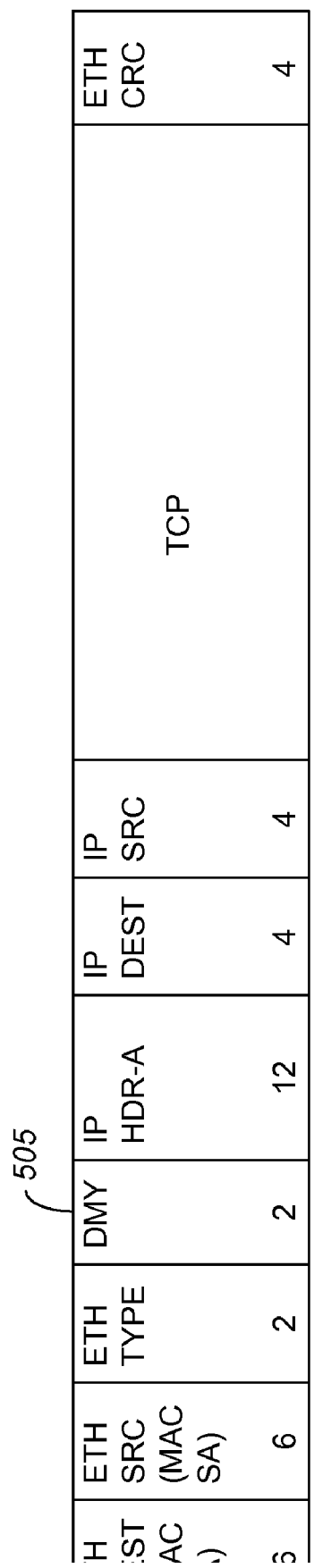
FIG. 7 is a block diagram of an Ethernet frame with dummy bytes inserted between the header and the payload.

In an alternative embodiment, the alignment module may suffix the dummy portion to the header, i.e., insert the dummy portion between the header and the payload, as shown in FIG. 7.

FIG. 1 illustrates an Ethernet frame in accordance with the IEEE 802.3 standard. However, other types of frames may benefit from the alignment technique. For example, an Ethernet V2 frame with an 802.1Q (VLAN) tag has an 18 byte header. Appending a two byte dummy portion to the header of such a frame would align the payload on the memory region boundaries 305 of the memory 240 (FIG. 3). Other frame formats include, for example, Ethernet V2 (14 byte header), Ethernet with 802.3 LLC/SNAP (22 byte header), and Ethernet with 802.3 LLC/SNAP and 802.1Q tag (26 byte header).

A number of embodiments have been described. Nevertheless, it will be understood that various modifications may be made without departing from the spirit and scope of the invention. For example, blocks in the flowcharts may be skipped or performed out of order and still produce desirable results. Accordingly, other embodiments are within the scope of the following claims.

What is claimed is:

1. An apparatus comprising:
   a network interface operative to receive an information portion, the information portion including a header and a payload, the payload having a first bit adjacent the header;
   a module operative to insert one or more non-data bits in the header;
   a memory including a plurality of memory regions; and
   a processor operative to receive the information portion with the one or more non-data bits from the module and store the information portion in the memory, the one or more non-data bits aligning the payload in the memory such that the first bit of the payload is aligned on a boundary between adjacent memory regions.

2. The apparatus of claim 1, wherein the module is operative to insert the one or more non-data bits in between one or more bits of the header.

3. The apparatus of claim 1, wherein the network interface comprises a switch.

4. The apparatus of claim 1, wherein the information portion comprises an Ethernet frame.

5. The apparatus of claim 1, wherein the payload comprises an Internet Protocol (IP) packet.

6. The apparatus of claim 1, wherein the header includes n bits and the memory regions include m bits, wherein the ratio n/m has a non-zero remainder p.

7. The apparatus of claim 6, wherein the one or more non-data bits consists of p bits.

8. The apparatus of claim 6, wherein n is 112.

9. The apparatus of claim 6, wherein m is 32.

10. The apparatus of claim 6, wherein p is 16.

11. The apparatus of claim 6, wherein the one or more non-data bits consists of x bits, where x=m*c+p and c is an integer.

12. The apparatus of claim 1, wherein the processor is operative to access the header in a shifted position in the memory.

13. The apparatus of claim 1, further comprising a protocol stack to extract the payload from the information portion in the memory.

14. The apparatus of claim 1, wherein the protocol stack comprises a TCP/IP software stack.

15. An apparatus comprising:
   a network interface operative to receive an information portion, the information portion including a header and a first payload, the first payload including a payload header, the payload header having a first bit adjacent the header;
   a module operative to insert a non-data portion in the payload header before the first bit of the payload header;
   a memory including a plurality of memory regions; and
   a processor operative to receive the information portion with the non-data portion from the module and store the information portion in the memory, the non-data portion aligning the first payload in the memory such that the first bit of the first payload is aligned on a boundary between adjacent memory regions.

16. A method comprising:
   detecting an information portion, the information portion including a header and a first payload, the first payload including a payload header, the payload header having a first bit adjacent the header;
   inserting a non-data portion in the payload header before the first bit of the payload header; and
   accessing the first payload.

17. The method of claim 16, wherein the information portion comprises an Ethernet frame.

18. The method of claim 16, wherein the payload comprises an Internet Protocol (IP) packet.

19. The method of claim 16, wherein the header includes n bits and the memory regions include m bits, wherein the ratio n/m has a non-zero remainder p.

20. The method of claim 19, wherein the non-data portion consists of p bits.

21. The method of claim 19, wherein n is 112.

22. The method of claim 19, wherein m is 32.

23. The method of claim 19, wherein p is 16.

24. The method of claim 19, wherein the non-data portion consists of x bits, where x=m*c+p and c is an integer.

* * * * *